April 20, 1948.  N. M. NORMAN ET AL  2,440,152
TRAILER COUPLING MECHANISM
Filed Oct. 18, 1945  2 Sheets-Sheet 1

INVENTORS.
Noah M. Norman
A.S. Brumby
BY
ATTORNEY

April 20, 1948.                N. M. NORMAN ET AL                2,440,152
                          TRAILER COUPLING MECHANISM
                  Filed Oct. 18, 1945                 2 Sheets-Sheet 2

INVENTORS.
Noah M. Norman
A. S. Brumby
BY
ATTORNEY

Patented Apr. 20, 1948

2,440,152

UNITED STATES PATENT OFFICE 2,440,152

TRAILER COUPLING MECHANISM

Noah M. Norman and Arnoldus S. Brumby, Birmingham, Ala., assignors to John P. K. Fontaine, Birmingham, Ala.

Application October 18, 1945, Serial No. 623,060

10 Claims. (Cl. 280—33.05)

This invention relates to a fifth wheel, or coupling mechanism, for coupling an automotive tractor to a trailer, particularly of the type embodying a fifth wheel having an elongated opening therein to receive the king pin on a trailer when coupling, together with locking means which close the opening and retain the king pin when coupled, and has for an object the provision of a latch means for holding the locking means free to open when coupling, thereby to prevent damage thereto, and which shall be released by engagement with the king pin when the coupling is made.

A further object of our invention is to provide means in a trailer coupling mechanism of the character designated wherein the locking means may be moved manually to clear the opening in the fifth wheel and when in open position be held by a latch positioned to be engaged by the king pin when the coupling is made and be thereby released.

A still further object of our invention is to provide coupling mechanism which shall include a latch for holding the locking means partially clear of the opening in the fifth wheel and which is released by engagement of the king pin with the locking means when uncoupling.

Another object of our invention is to provide, in coupling mechanism of the character described embodying coupling members actuated by impact with the king pin in coupling, a manually operable lever for moving the coupling members to uncoupled position, a latch for holding the lever in coupled position, a second latch releasable by the king pin when coupling to hold the lever in position with the coupling members in open position, and a third latch for holding the lever in position with the coupling members in partially open position and releasable upon further movement of the lever due to impact of the king pin with the coupling members in uncoupling.

While not necessarily limited thereto our invention is particularly applicable to the apparatus shown in prior Patent No. 2,372,943 issued April 3, 1945, to John P. K. Fontaine and Noah M. Norman. The mechanism there shown embodies a pair of pivoted locking jaws together with a manually operable lever rigidly connected to one of the jaws and connected by a link to the other jaw whereby they may be swung open when uncoupling. With such mechanism, it is preferable that the locking jaws be held latched when in closed position to prevent accidental uncoupling and should be held in open position when coupling and closed after the king pin on the tractor has entered the fifth wheel between the locking jaws. In accordance with our invention, we provide a latch comprising a member pivotally mounted on the fifth wheel and lying in the path of the king pin as it enters between the locking jaws. When the manually operable lever is moved to a position to open the locking jaws, with the tractor uncoupled, the latch is engaged by a detent on the lever. When the king pin enters between the locking jaws in coupling, the latch is disengaged and cannot again be engaged until the king pin moves out of coupled position. We also provide a safety latch which automatically engages the operating lever to hold it in position with the locking jaws closed to prevent accidental uncoupling.

Also embodied in our improved mechanism is another latch adapted to engage the operating lever at an intermediate point in its travel toward uncoupled position and which holds the locking jaws in partially open position when uncoupling. This latch is released automatically by further movement of the lever toward uncoupled position, brought about by action of the king pin on the locking jaws when uncoupling. As the king pin moves clear of the fifth wheel, the first mentioned latch engages the lever and holds it in position with the locking jaws open, ready again to receive the king pin.

Apparatus embodying features of our invention is illustrated in the accompanying drawing, forming a part of this application, in which Fig. 1 is a sectional elevation of coupling mechanism having our improved latch applied thereto;

Figure 1:
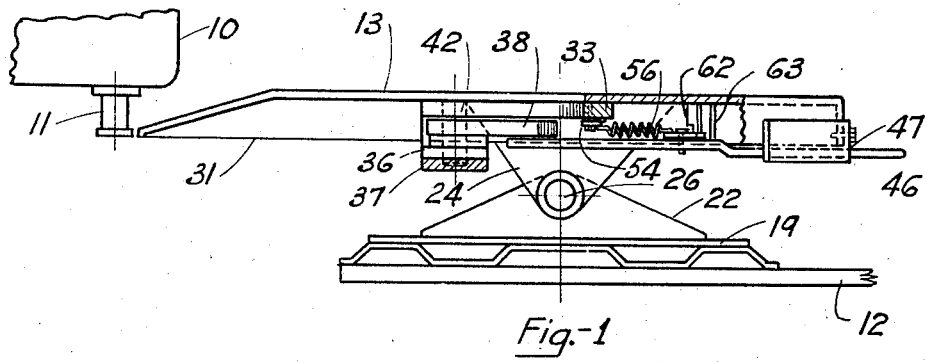

Referring now to the drawing, for a better understanding of our invention, we show in Fig. 1 a fragment of a trailer vehicle 10 carrying a king pin 11. At 12 is shown a fragment of a tractor vehicle to which our improved coupling mechanism is applied. The coupling mechanism comprises a fifth wheel plate 13 having secured to the under side thereof lateral brackets 14 and 16 carrying bearings 17 and 18. A supporting base 19 on the tractor 12 has mounting brackets 22 mounted thereon which mounting brackets carry bearings 24. A rocker shaft 26 extends through the bearings 24 and 17 and 18 to mount the assembly pivotally on the rear of the tractor 12.

The plate 13 is provided with an elongated flaring opening 27 which extends from the rear forwardly and is rounded internally of the plate as shown at 28. Extending around the outer periphery of the plate 13 is a reinforcing flange 29, and the sides of the opening 27 are reinforced by means of flanges 31 and 32. On the under side of the plate 13 and extending around the rounded portion 28 of the opening 27 is a relatively heavy reinforcing block 33 which is welded or otherwise suitably secured to the plate 13. As will be seen from Figs. 2 and 3, the reinforcing block 33 is provided with a rounded opening 34 corresponding to the rounded opening 28 of the plate 13. A strap 36 extends across the plate below the reinforcing blocks 33, spanning the opening 34, and is provided with a downward bend 37 to clear the king pin 11 when coupling to the trailer. The strap 36 is preferably welded both to the plate 13 and to the sides of the reinforcing blocks 33.

At 38 and 39 are shown locking jaws which are pivotally mounted on opposite sides of the opening 27 by means of pins 41 and 42 which extend downwardly through the sides of the reinforcing blocks 33 and through the strap 36, thus mounting the locking jaws between the strap and the blocks 33. The locking jaws, as shown, extend forward from their pivot points and terminate beneath the rounded opening 28. The forward ends of the locking jaws 38 and 39 are provided with rounded bearing surfaces 43 and 44, respectively, against which the king pin 11 bears when the trailer 10 is being hauled. It will be noted that the pivot pins 41 and 42 are located substantially in the longitudinal axes of the locking jaws and that the rounded surfaces 43 and 44 are located inwardly of said longitudinal axes, whereby pressure by the king pin against the rounded surfaces 43 and 44 serves to draw the locking jaws closer together.

The locking jaws 38 and 39 are swung to open position to uncouple the trailer 10 from the tractor 12 by means of a lever 46 which extends outwardly through a slot 47 in the flange 29 and which is secured, inwardly of the fifth wheel, to the locking jaw 39. By this means, when the lever 46 is swung in the direction shown by the arrow, the locking jaw 39 is moved toward open position. At 48 is shown a link which is pivotally connected to the locking jaw 38 at 49, and which is pivotally connected to the lever 46 at 51. It will be seen that when the lever 46 is moved in the direction shown by the arrow to open the locking jaw 39, the link 48 will also pull the locking jaw 38 in the opposite direction toward open position. The lever 46 is biased in a direction to move the locking jaws toward closed position by a spring 50.

Figure 2:
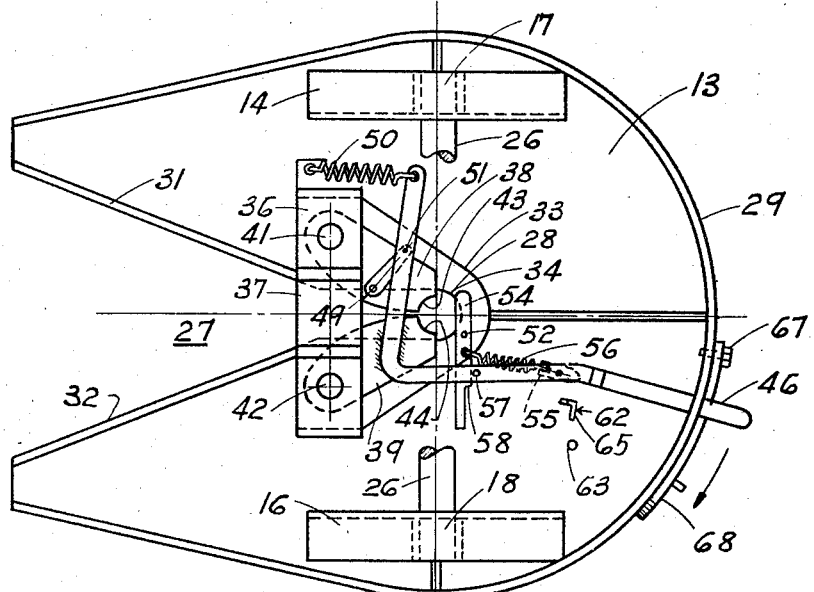
Fig. 2 is a bottom plan view thereof.

Pivotally mounted at 52 on the block 33 is my improved safety latch 54 which has one end overhanging the opening 34 in the block 33. The other end of the latch 54 extends across over the lever 46 and is biased rearwardly by means of a spring 56 which is secured at one end to the latch 54 and at the other end to a latch member 55 to be described later. A pin 57 carried by the lever 46 engages the latch as shown in Fig. 2 to limit its forward swing. The forward side of the outer end of the latch 54 is provided with a notch 58, which when the lever 46 is moved to a position to open the locking jaws 38 and 39, engages the pin 57 and holds the lever 46 in position with the locking jaws open. It will be noted that in this position, the inner end of the latch 54 lies in the path of the king pin 11. It will thus be seen that by means of our invention, whenever it is desired to couple the trailer 10 to the tractor 12, the lever 46 is moved to the position shown in Fig. 3 of the drawing with the notch 58 of the latch 54 engaged with the pin 57 on the lever 46. When the tractor is moved into coupling position with the king pin 11 occupying the opening 34 in the block 33, the king pin 11 strikes the latch 54 and disengages it from the pin 57, whereupon the lever 46 is released and the locking jaws 38 and 39 move to closed position, as shown in Fig. 2.

Figure 3:
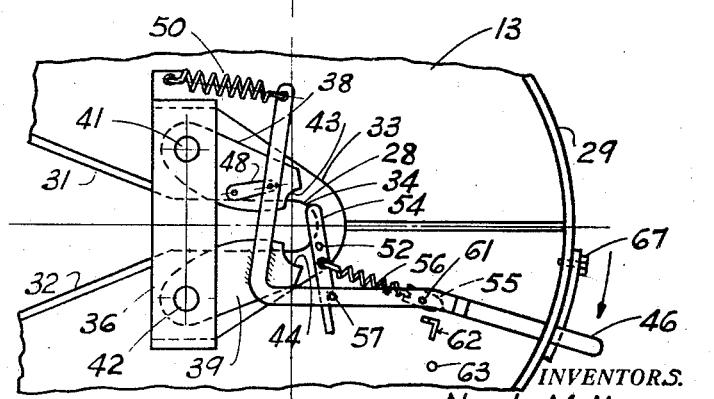
Fig. 3 is a fragmentary bottom plan view showing the locking jaws in open position with the latch engaged.
Figure 4:
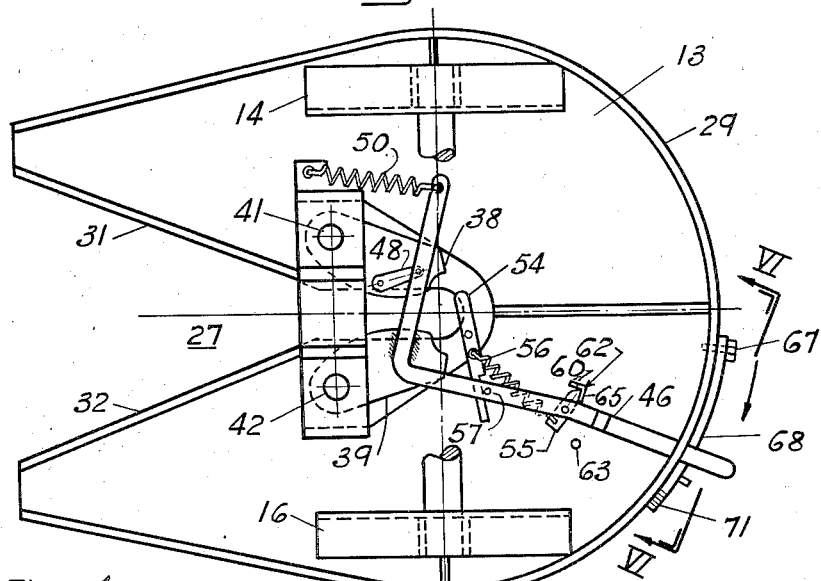
Fig. 4 is a similar view showing the position of the parts when getting ready to uncouple.
Figure 5:
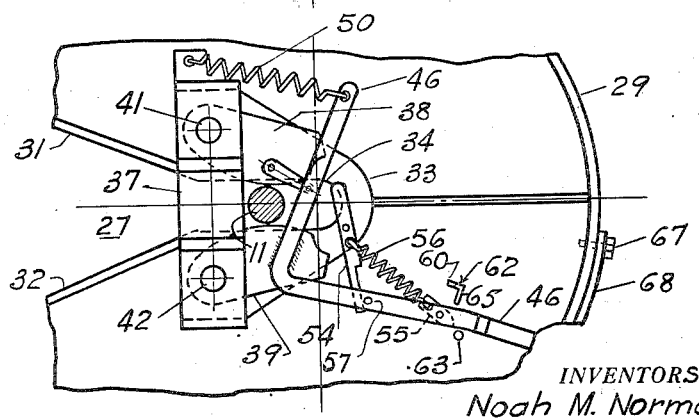
Fig. 5 is a view showing the position of the parts during uncoupling.

The latch member 55, as may be seen in Figs. 3 and 4 is pivotally mounted at 61 on the lever 46 and is yieldingly held by the spring 56 which joins it to the latch 54. At 62 is shown a detent carried by the fifth wheel plate 13 and which lies in the path of movement of the latch member 55 as the lever 46 is swung to wide open position of the locking jaws 38 and 39. Beyond the detent 62 in the direction of movement of the lever 46 is a stop member 63 carried by the fifth wheel plate 13. The detent 62 is in the form of an angle with the sides facing the latch member so that there are provided two surfaces for the latch member to strike as the lever is moved to wide open position. The latch member 55 first strikes the near side 60 of the detent 62 and is then engaged by the second surface 65 in the position shown in Fig. 4 of the drawing. In this position, the locking jaws 38 and 39 are still only partially open so that, when engaged by the king pin 11 upon uncoupling, the locking jaws are moved further apart until the latch member 55 passes the side 65 of the detent 62 as shown in Fig. 5, in which position the locking jaws 38 and 39 are wide open. As the king pin 11 moves out from between the locking jaws 38 and 39, the spring 50 pulls the lever 46 in a direction to close the locking jaws and the latch member 55 is turned the other way about its pivot so as to swing freely past the detent 62. At the same time, the spring 50 pulls the shoulder 58 of the latch 54 into engagement with the pin 57 on the lever 46, and the parts assume the position shown in Fig. 3 ready to receive again the king pin 11.

Figure 6:
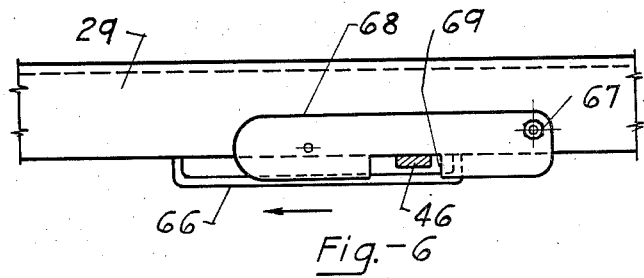
Fig. 6 is a view of the safety latch looking in the direction of the arrows VI—VI of Fig. 4.

In Fig. 6 we show the latch for holding the lever 46 in its position with the locking jaws 38 and 39 closed, as shown in Fig. 2. This comprises a strap 66 secured to the flange 29 and which serves as a guide for the lever 46. Pivotally mounted on the flange 29 at 67 and overhanging the lever 46 is a latch member 68 having a shoulder 69 thereon, which in cooperation with the strap 66 holds the lever 46 in place. The lever 46, as viewed in Fig. 6, moves to the left to open the locking dogs toward the extreme end of the strap 66. The left hand end 71 of the latch 68, as viewed in Fig. 6, is rounded so as to be raised by the lever 46 when moving toward coupled position. When uncoupling, the latch member 68 is raised manually to release the lever 46.

From the foregoing description, the operation of our improved apparatus will be readily understood. When the trailer is coupled to the tractor, the parts are in the position shown in Fig. 2. In that position, the lever 46 is engaged with the shoulder 69 of the safety latch 68, the king pin 11 holds the latch 54 clear of the detent 57 and the latch 55 is clear of its detent 62. Whenever it is desired to uncouple the tractor from the trailer, the latch 68 is released and the lever 46 is moved manually to the position shown in Fig. 4. In this position, the locking jaws 38 and 39 are partially open, the lever has moved to a position where the detent 57 is beyond the notch 58 in the latch 54 and the latch 55 is engaged in the angle of the detent 62. As the tractor moves away from the trailer, the parts assume the position shown in Fig. 5 of the drawings, in which the latch 55 has moved beyond the detent 62 so as to be released therefrom, the king pin 11 having opened the locking jaws 38 and 39 wider as it passes between them. When the uncoupling is completed, the parts assume the position shown in Fig. 3 of the drawings in which the lever 46 has moved back past the detent 62 and the notch 58 in the latch 54 is engaged with the detent 57, holding the locking jaws partially open, ready to be coupled. When the tractor is again coupled to the trailer, the king pin 11 entering the circular recess 28 strikes the latch 54, releasing it from the detent 57, and the locking jaws 38 and 39 move to closed position by the action of the spring 50 on the lever 46. In this position, the lever 46 is again engaged by the safety latch 68.

It will thus be seen that we have devised an improved operating means for trailer coupling mechanism which is simple of design and operation and by means of which a tractor may be coupled and uncoupled from a trailer with a minimum of manual operation and with a minimum of damage to the mechanism.

While we have shown our invention in but one form, it will be obvious to those skilled in the art that it is not so limited, but is susceptible of various changes and modifications, without departing from the spirit thereof, and we desire, therefore, that only such limitations shall be placed thereupon as are specifically set forth in the appended claims.

What we claim is:

1. In a trailer coupling mechanism embodying a pair of pivoted locking jaws adapted to swing apart to receive a king pin when coupling, a manually operable lever operatively connected to the jaws to open and close them, a latch member pivotally mounted to lie across the jaws in the path of the king pin when coupling, and a detent carried by the lever and disposed to engage the latch and hold the jaws open when the lever is moved to open position and to be disengaged from the latch member by the king pin when coupling.

2. In a trailer coupling mechanism embodying a pair of pivoted locking jaws adapted to swing apart to receive a king pin when coupling, a manually operable lever operatively connected to the jaws to open and close them, a latch member pivotally mounted to lie across the jaws in the path of the king pin when coupling, a detent carried by the lever and disposed to engage the latch and hold the jaws open when the lever is moved to open position and to be disengaged from the latch member by the king pin when coupling, and a spring for moving the lever toward closed position of the locking jaws.

3. In trailer coupling mechanism, a fifth wheel having an elongated opening therein adapted to receive a king pin when coupling, locking means mounted to be moved to close the opening and retain the king pin when coupled and to be moved to clear the opening and release the king pin when uncoupling, a manually operable lever for moving the locking means, a latch member pivotally mounted on the fifth wheel with one end extending across the opening in the path of the king pin when coupling and having a notch in the other end thereof, a detent carried by the lever and disposed to engage the notch in the latch member when the lever is moved to clear the opening and to be disengaged by the king pin striking the latch member, and a spring for biasing the lever in a direction to close the opening in the fifth wheel.

4. Apparatus as defined in claim 3 in which the locking means comprise a pair of locking jaws pivotally mounted on the fifth wheel to swing toward each other to close the opening in the fifth wheel and to swing apart to clear said opening.

5. Apparatus as defined in claim 3 in which the locking means comprise a pair of locking jaws pivotally mounted on the fifth wheel to swing toward each other to close the opening in the fifth wheel and to swing apart to clear said opening, and in which the lever is rigidly connected to one of locking jaws and is connected by a link to the other whereby to move the locking jaws in opposite directions.

6. In trailer coupling mechanism, a fifth wheel having an elongated opening therein adapted to receive a king pin when coupling, locking means mounted to be moved to close the opening and retain the king pin when coupled and to be moved to clear the opening and release the king pin when uncoupling, a manually operable lever for moving the locking means, a latch member pivotally mounted between its ends on the lever, a spring biasing the latch member to a position substantially parallel to the lever, an angular detent with sides facing the latch in position to be struck by the latch member and swing it about its pivot as the lever is moved to open the locking means and to engage the latch member in the angle of the detent when the locking means are part way open, the latch member upon further movement of the lever to open the locking means moving past the angle of the detent to be released.

7. In trailer coupling mechanism, a fifth wheel having an elongated opening therein adapted to receive a king pin when coupling, locking means mounted to be moved to close the opening and retain the king pin when coupled and to be moved to clear the opening and release the king pin when uncoupling, a manually operable lever for moving the locking means, a latch member pivotally mounted on the fifth wheel with one end extending across the opening in the path of the king pin when coupling and having a notch in the other end thereof, a detent carried by the lever and disposed to engage the notch in the latch member when the lever is moved to clear the opening and to be disengaged by the king pin striking the latch member, a spring for biasing the lever in a direction to close the opening in the fifth wheel, a second latch member pivotally mounted between its ends on the lever, a spring connecting the two latch members and biasing the second latch member to a position substantially parallel to the lever, an angular detent with sides facing the second latch member in position to engage the other end of said latch member and swing it about its pivot as the lever is moved to clear the opening, and to engage said second latch member in the angle of the detent when the opening is partially clear, the second latch member upon further movement of the lever to clear the opening moving past the angle of the detent to be released.

8. In trailer coupling mechanism, a fifth wheel having an elongated opening therein adapted to receive a king pin when coupling, locking means mounted to be moved to close the opening and retain the king pin when coupled and to be moved to clear the opening and release the king pin when uncoupling, a manually operable lever for moving the locking means, a latch member pivotally mounted between its ends on the lever, a spring secured to the inner end of the latch member, a detent mounted in the path of the free outer end of the latch member to be struck thereby as the lever is moved to open the locking means and adapted to engage the latch members when it passes the engaging side of the detent and to release the latch member upon further opening movement of the lever.

9. In trailer coupling mechanism, a fifth wheel having an elongated opening therein adapted to receive a king pin when coupling, locking means mounted to be moved to close the opening and retain the king pin when coupled and to be moved to clear the opening and release the king pin when uncoupling, a manually operable lever for moving the locking means, a latch member pivotally mounted between its ends on the lever, a spring secured to the inner end of the latch member, a detent mounted in the path of the free outer end of the latch member and presenting two surfaces to be struck successively by the latch member as the lever is moved to open the locking means, and to engage said latch member when it passes the first of said surfaces to hold the lever in an intermediate position.

10. In trailer coupling mechanism, a fifth wheel having an elongated opening therein adapted to receive a king pin when coupling, locking means mounted to be moved to close the opening and retain the king pin when coupled and to be moved to clear the opening and release the king pin when uncoupling, a manually operable lever for moving the locking means, a latch member pivotally mounted between its ends on the lever, a spring secured to the inner end of the latch member, a detent mounted in the path of the free outer end of the latch member and presenting two surfaces to be struck successively by said end of the latch member as the lever is moved to open the locking means and to swing said latch member about its pivot, said detent being adapted to engage and hold the latch member when the free end is between the two surfaces and to release said latch member for return movement of the lever upon further opening movement of the lever.

NOAH M. NORMAN.
ARNOLDUS S. BRUMBY.

REFERENCES CITED

The following references are of record in the file of this patent:

UNITED STATES PATENTS

| Number | Name | Date |
|---|---|---|
| 2,044,227 | Robb | June 16, 1936 |
| 2,077,484 | King | Apr. 20, 1937 |
| 2,372,943 | Fontaine et al. | Apr. 3, 1945 |